United States Patent
Liang

(10) Patent No.: US 12,213,007 B2
(45) Date of Patent: Jan. 28, 2025

(54) INFORMATION PROCESSING METHOD AND TERMINAL

(71) Applicant: VIVO MOBILE COMMUNICATION CO., LTD., Guangdong (CN)

(72) Inventor: Jing Liang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 406 days.

(21) Appl. No.: 17/726,075

(22) Filed: Apr. 21, 2022

(65) Prior Publication Data

US 2022/0248271 A1  Aug. 4, 2022

Related U.S. Application Data

(63) Continuation of application No. PCT/CN2020/127081, filed on Nov. 6, 2020.

(30) Foreign Application Priority Data

Nov. 6, 2019 (CN) .......................... 201911078538.3

(51) Int. Cl.
*H04W 28/24* (2009.01)

(52) U.S. Cl.
CPC .................. *H04W 28/24* (2013.01)

(58) Field of Classification Search
None
See application file for complete search history.

(56) References Cited

U.S. PATENT DOCUMENTS

| | | |
|---|---|---|
| 2011/0170495 A1 | 7/2011 | Earnshaw |
| 2017/0245292 A1 | 8/2017 | Agiwal et al. |
| 2018/0184463 A1 | 6/2018 | Fakoorian et al. |
| 2019/0053260 A1 | 2/2019 | Shaheen |
| 2019/0200375 A1 | 6/2019 | Yasukawa et al. |
| 2019/0357235 A1 | 11/2019 | Wang et al. |
| 2020/0236581 A1* | 7/2020 | Zhang ................. H04W 28/082 |
| 2020/0314915 A1* | 10/2020 | Lin ........................ H04W 72/56 |

(Continued)

FOREIGN PATENT DOCUMENTS

| | | |
|---|---|---|
| CN | 107534829 A | 1/2018 |
| CN | 110249691 A | 9/2019 |

(Continued)

OTHER PUBLICATIONS

Extended European Search Report for Application No. 24156019.2, dated Apr. 15, 2024, 11 Pages.

(Continued)

*Primary Examiner* — Derrick V Rose
(74) *Attorney, Agent, or Firm* — BROOKS KUSHMAN P.C.

(57) ABSTRACT

An information processing method and a terminal are disclosed. The information processing method applied to a terminal includes: determining a priority of first information; and performing, based on the priority of the first information, an operation associated with the priority of the first information; where a RAT corresponding to the first information is NR; and the priority of the first information is a first priority corresponding to the first information or a dedicated priority; or the priority of the first information is determined according to a predefined rule.

20 Claims, 2 Drawing Sheets

(56) References Cited

U.S. PATENT DOCUMENTS

2021/0289473 A1   9/2021  Chae et al.
2022/0377738 A1*  11/2022 Baek ................ H04W 72/0453
2023/0354402 A1*  11/2023 Yin .................. H04W 72/0453

FOREIGN PATENT DOCUMENTS

| CN | 110291831   A  | 9/2019 |
|----|----------------|--------|
| JP | 2013059050  A  | 3/2013 |
| JP | 2019525655  A  | 9/2019 |
| WO | 2018030396  A1 | 2/2018 |
| WO | 2018030854  A1 | 2/2018 |
| WO | 2019041350  A1 | 3/2019 |
| WO | 2019156528  A1 | 8/2019 |

OTHER PUBLICATIONS

First Office Action for Singapore Application No. 11202204165X, dated Mar. 11, 2024, 6 Pages.
First Office Action for Chinese Application No. 201911078538.3, dated Feb. 24, 2022, 8 Pages.
International Search Report and Written Opinion for Application No. PCT/CN2020/127081, dated Feb. 18, 2021, 7 Pages.
Second Office Action for Chinese Application No. 201911078538.3, dated Aug. 29, 2022, 6 Pages.
Samsung, "Discussion on QoS Management for NR V2X," 3GPP TSG RAN WG1 #94, Agenda item 7.2.4.4, Aug. 20-24, 2018, R1-1808783, Gothenburg, Sweden, 2 Pages.
Mediatek Inc., "Remaining Issues of SL LCP," 3GPP TSG-RAN WG2 #107bis, Agenda item 6.4.2, Oct. 14-18, 2019, R2-1913236 (Revision of R2-1911127), Chongqing, China, 5 Pages.
Ericsson, "Congestion Control for NR Sidelink," 3GPP TSG-RAN WG1 #98bis, Agenda item 7.2.4.6, Oct. 14-20, 2019, R1-1910539, Chongqing, China, 6 Pages.
European Patent Office, Extended European Search Report for Application No. 20884906.7 dated Nov. 29, 2022.
Bgpp Tr 37.985 V0.2.0, 3rd Generation Partnership Project; Technical Specification Group Radio Access Network; Overall description of Radio Access Network (RAN) aspects for Vehicle-to-everything (V2X) based on LTE aspects for Vehicle-to-everything (V2X) based on LTE and NR (Release 16), dated Oct. 2019.
Bgpp Ts 23.287 V16.0.0, 3rd Generation Partnership Project; Technical Specification Group Services and System Aspects; Architecture enhancements for 5G System (5GS) to support Vehicle-to-Everything (V2X) services (Release 16), dated Sep. 2019.
Source: CATT, 3GPP TSG RAN WG1 Meeting #97, Reno, USA, In-device coexistence of LTE and NR sidelink, Discussion and Decision, dated May 13-17, 2019.
Source: ZTE, Sanechips, 3GPP TSG RAN WG1 #98, Prague, Cz, In-device coexistence between NR V2X and LTE V2X, Discussion and Decision, dated Aug. 26-30, 2019.
Source: Huawei (TR editor), Title: TR 37.985, "Overall description of Radio Access Network (RAN) aspects for Vehicle-to-everything (V2X) based on LTE and NR", v0.2.0, dated Oct. 14-20, 2019.
First Office Action for Japanese Application No. 2022-521252, dated Mar. 16, 2023, 4 Pages.
Seond Office Action for Japanese Application No. 2023-101303, dated Aug. 15, 2024, 3 Pages.
LG Electronics "Discussion on physical layer procedures for NR sidelink" 3GPP TSG RAN WG1 Meeting #98bis, Chongqing, China, Oct. 2019, R-1910783, 25 Pages.
First Office Action for Korean Application No. 10-2022-7014027, dated Aug. 26, 2024, 10 Pages.
LG Electronics "Discussion on in device coexistence between LTE and NR sidelinks" 3GPP TSG RAN WG1 #97, Reno, USA, May 2019, R1-1907017, 2 Pages.
Qualcomm Incorporated "Summary of In-device Coexistence Aspects in NR-V2X (AI 7.2.4.4)" 3GPP TSG RAN WG1 Meeting #97, Reno, USA, May 2019, R1-1907720, 7 Pages.
NEC "Discussion on Qos management" 3GPP TSG RAN WG1 #98, Prague, CZ, Aug. 2019, R1-1908849, 2 Pages.
Session Chair (Intel Corporation) "Report from session on LTE V2X and NR V2X" 3GPP TSG-RAN WG2 Meeting #106, Reno, USA, May 2019, R2-1908107, 30 Pages.

* cited by examiner

INFORMATION PROCESSING METHOD AND TERMINAL

CROSS-REFERENCE TO RELATED APPLICATIONS

This application is continuation application of PCT International Application No. PCT/CN2020/127081 filed on Nov. 6, 2020, which claims priority to Chinese Patent Application No. 201911078538.3, filed on Nov. 6, 2019, which are incorporated herein by reference in their entireties.

TECHNICAL FIELD

The present invention relates to the field of communications technologies, and in particular, to an information processing method and a terminal.

BACKGROUND

Currently, one terminal may have both long term evolution (LTE) information (for example, data or signaling) and new radio (NR) information (for example, data or signaling) that need to be transmitted/received. When the two types of information cannot be transmitted/received simultaneously, the terminal needs to preferentially transmit/receive information with a higher priority based on priorities of the LTE information and NR information. However, it is not yet clear how the priority of NR information is determined, which affects efficient transmission of the terminal.

SUMMARY

Embodiments of the present invention provide an information processing method and a terminal.

The present invention is implemented as follows:

According to a first aspect, an embodiment of the present invention provides an information processing method, including:

determining a priority of first information; and performing, based on the priority of the first information, an operation associated with the priority of the first information;

where a RAT corresponding to the first information is NR; and the priority of the first information is a first priority corresponding to the first information or a dedicated priority; or the priority of the first information is determined according to a predefined rule.

According to a second aspect, an embodiment of the present invention provides a terminal, including:

a determining module, configured to determine a priority of first information; and an execution module, configured to perform, based on the priority of the first information, an operation associated with the priority of the first information;

where a RAT corresponding to the first information is NR; and the priority of the first information is a first priority corresponding to the first information or a dedicated priority; or the priority of the first information is determined according to a predefined rule.

According to a third aspect, an embodiment of the present invention provides a terminal, including a memory, a processor, and a computer program stored in the memory and capable of running on the processor, where when the computer program is executed by the processor, the steps of the foregoing information processing method are implemented.

According to a fourth aspect, an embodiment of the present invention provides a computer-readable storage medium, where the computer-readable storage medium stores a computer program, and when the computer program is executed by a processor, the steps of the foregoing information processing method are implemented.

BRIEF DESCRIPTION OF DRAWINGS

To describe the technical solutions in the embodiments of the present invention more clearly, the following briefly describes the accompanying drawings required for the embodiments of the present invention. Apparently, the accompanying drawings in the following description show merely some embodiments of the present invention, and persons of ordinary skill in the art may still derive other drawings from these accompanying drawings without creative efforts.

DETAILED DESCRIPTION

Figure 1:
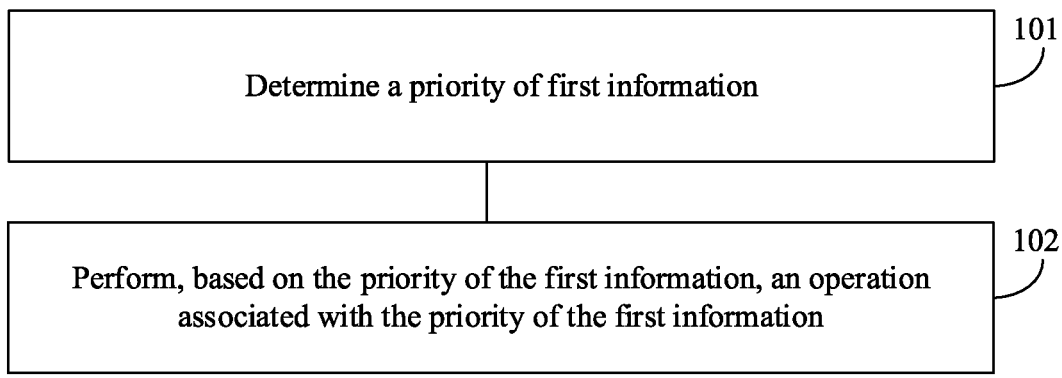
FIG. 1 is a flowchart of an information processing method according to an embodiment of the present invention.

To describe the technical solutions in the embodiments of the present invention more clearly, the following briefly describes the accompanying drawings required for the embodiments of the present invention. Apparently, the accompanying drawings in the following description show merely some embodiments of the present invention, and persons of ordinary skill in the art may still derive other drawings from these accompanying drawings without creative efforts.

The terms "first", "second", and the like in this specification and claims of this application are used to distinguish between similar objects instead of describing a specific order or sequence. It should be understood that the data used in this way is interchangeable in appropriate circumstances, so that the embodiments of this application described herein can be implemented in other orders than the order illustrated or described herein.

A wireless communications system provided in the embodiments of the present invention includes a terminal and a network device. The terminal may also be referred to as a terminal device or user equipment (UE). The terminal may be a terminal side device such as a mobile phone, a tablet personal computer, a laptop computer, a personal digital assistant (PDA), a mobile Internet device (MID), a wearable device, or an in-vehicle device. It should be noted that the specific type of the terminal is not limited in the embodiments of the present invention. The network device may be a base station or a core network, where the base station may be a base station of 5G or a later version (for example, a gNB or a 5G NR NB), or a base station in other communications systems (for example, an eNB, a WLAN access point, or another access point). The base station may be referred to as a NodeB, an evolved NodeB, an access point, a base transceiver station (BTS), a radio base station, a radio transceiver, a basic service set (BSS), an extended service set (ESS), a Node B, an evolved node B (eNB), a home NodeB, a home evolved NodeB, a WLAN access point, a Wi-Fi node, or another appropriate term in the art. As long as the same technical effect is achieved, the base station is not limited to a specific technical term.

In the embodiments of the present invention, in a ProSe network architecture, a communications interface between terminals is called a PC5 interface, and an interface connecting a terminal and an access network device in an E-UTRAN is called a Uu interface.

For a vehicle to everything (V2X) service in a long term evolution (LTE) system, when transmitting a V2X message (or a V2X data packet) to an access stratum (AS), an application layer adds, into the V2X message, PPPP (ProSe Per-Packet Priority) and PPPR (ProSe Per-Packet Reliability) information that are used for transmitting the V2X message through the PC5 interface. The PPPP indicates a priority of data packet transmission. A higher PPPP (a total of eight PPPP values are present, and a smaller value indicates a higher priority) corresponds to a higher packet delay requirement. The PPPR indicates a required degree of reliability (reliability) in data packet transmission.

Different V2X services usually have different performance requirements. A performance requirement indicator for a V2X service of advanced new radio (NR), that is, NR advanced can be identified by a PC5 interface quality of service indicator (PC5 Quality of Service Indicator, PQI). The PQI can be understood as a special type of 5QI used for the PC5 interface, and also has its own value and a set of corresponding quality of service (QoS) parameters.

In sidelink (or called side link), logical channels SCCH and STCH are introduced in NR. The SCCH is used for transmitting a PC5-RRC message and a PC5-S message, and the two messages use different signaling radio bearers (SRB). The STCH is used for transmitting data. A priority of a logical channel is configured by a network device or pre-configured.

In the embodiments of the present invention, transceiving may be understood as transmission or reception.

In the embodiments of the present invention, in some cases, the priority may be understood as a priority value, or may be understood as a priority level.

In the embodiments of the present invention, optionally, the priority may be any one of the following: (I) a priority defined by a physical layer; (II) a priority defined by a high layer (for example, the access stratum AS), for example, a logical channel priority or a priority configured independently based on a QoS parameter; (III) a priority defined by a high layer (for example, a non-access stratum NAS), for example, a PC5 quality of service flow indicator (PFI), a PQI, a default priority level in a PQI, or a priority indicated by the application layer.

In the embodiments of the present invention, an upper layer is a high layer that is not a physical layer, and optionally may be an AS high layer or a non-AS high layer.

In the embodiments of the present invention, sidelink control information (SCI) may be first-stage SCI (first stage SCI) or second-stage SCI (second stage SCI).

In the embodiments of the present invention, the QoS parameter may include at least one of the following:
  (I) PQI or a specific parameter value, where the specific parameter value may include at least one of the following: a resource type, a priority level, a packet delay budget, a packet error rate, an average window, a maximum data peak value, and the like;
  (II) a PC5 flow bit rate, for example, the PC5 flow bit rate may include at least one of a guaranteed flow bit rate (GFBR) and a maximum flow bit rate (MFBR); and
  (III) a range, for example, the range is a maximum communication range or a minimum communication range.

In the embodiments of the present invention, a high priority may be understood as a higher priority, which indicates a higher actual priority and does not indicate a specific priority value. In some embodiments, it is possible that a lower priority value indicates a higher corresponding priority.

The following describes the present invention in detail with reference to the embodiments and the accompanying drawings.

Referring to FIG. 1, FIG. 1 is a flowchart of an information processing method according to an embodiment of the present invention. The method is applied to a terminal, and as shown in FIG. 1, includes the following steps.

Step 101: Determine a priority of first information.

In this embodiment, the priority of the first information may be a first priority corresponding to the first information or a dedicated priority. Alternatively, the priority of the first information may be determined according to a predefined rule, where the predefined rule is, for example, specified by a protocol, configured by a network, or pre-configured.

Optionally, a radio access technology (RAT) corresponding to the first information may be NR, a communications technology of a later version, or the like, which is not limited in this embodiment.

In an embodiment, when the RAT corresponding to the first information is NR, the priority of the first information is priority indication carried in NR SCI (for example, sidelink transmission information).

Step 102: Perform, based on the priority of the first information, an operation associated with the priority of the first information.

In this embodiment, the performing an operation associated with the priority of the first information may be transmitting/receiving the first information, or performing another procedure associated with the priority, for example, a sensing procedure, a resource selection or reselection procedure, or a procedure of comparing with a priority of other information when transmitting/receiving the other information.

The information processing method provided in this embodiment of the present invention can determine the priority of the first information (for example, NR information), thereby ensuring efficient transmission of the terminal. Further, for example, in the case of transmitting/receiving NR information and other RAT information simultaneously, the terminal can preferentially transmit/receive important information, thereby making overall performance of a communications system better.

In this embodiment of the present invention, the first information may include but is not limited to any one of the following: sidelink data, PC5 media access control control element (MAC CE), PC5 discovery related message, PC5 synchronization related message, PC5-RRC message (PC5-RRC message for short), PC5-S message (PC5-S message for short), and the like.

The sidelink data may be data transmitted on a DRB. The PC5-RRC message and the PC5-S message may both be messages transmitted on an SRB. The PC5 synchronization related message may include but is not limited to any one of the following: sidelink synchronization signal and PBCH block (S-SSB), LTE sidelink synchronization signal (SLSS), LTE physical sidelink broadcast channel (PSBCH), and the like.

For the MAC CE, PC5 discovery related message, PC5 synchronization related message, PC5-RRC message, and PC5-S message, a configurable or fixed priority may be defined, where the fixed priority may be specified by a protocol. In this way, when transmitting/receiving MAC CE and PC5 message, the terminal may use the corresponding priorities as priority indications.

Optionally, the foregoing predefined rule may include any of the following:

(1) A PC5 synchronization related message has a highest priority.

(2) Priorities of a MAC CE and a signaling radio bearer are higher than a priority of a data radio bearer.

It can be understood that, in (2), the priority of a MAC CE is higher than the priority of a data radio bearer, and the priority of a signaling radio bearer is also higher than the priority of a data radio bearer. The priority of a signaling radio bearer and the priority of a data radio bearer may be specified by a protocol, configured by a network, or pre-configured.

(3) A priority of a first-type MAC CE is higher than a priority of a second-type MAC CE.

The first-type MAC CE and the second-type MAC CE may correspond to different RATs, or may correspond to a same RAT.

For example, the first-type MAC CE is MAC CE in NR, and the second-type MAC CE is MAC CE in LTE; or the first-type MAC CE is MAC CE in LTE, and the second-type MAC CE is MAC CE in NR.

(4) A priority of a first-type signaling radio bearer is higher than a priority of a second-type signaling radio bearer.

The first-type signaling radio bearer and the second-type signaling radio bearer may correspond to different RATs, or may correspond to a same RAT. The priority of a signaling radio bearer (that is, the first-type signaling radio bearer and the second-type signaling radio bearer) may be specified by a protocol, configured by a network side, or pre-configured. A priority of a message on a signaling radio bearer may be based on the priority of a signaling radio bearer.

For example, the first-type signaling radio bearer is a bearer in NR, and the second-type signaling radio bearer is a bearer in LTE; or the first-type signaling radio bearer is a bearer in LTE, and the second-type signaling radio bearer is a bearer in NR.

(5) A descending order of priority is preset as: third-type MAC CE, signaling radio bearer, fourth-type MAC CE, and data radio bearer.

The third-type MAC CE and the fourth-type MAC CE may correspond to different RATs, or may correspond to a same RAT. The priority of a signaling radio bearer and the priority of a data radio bearer may be specified by a protocol, configured by a network, or pre-configured. A priority of a message on a signaling radio bearer may be based on the priority of a signaling radio bearer. A priority of a message on a data radio bearer may be based on the priority of a data radio bearer.

For example, the third-type MAC CE is MAC CE in NR, and the fourth-type MAC CE is MAC CE in LTE; or the third-type MAC CE is MAC CE in LTE, and the fourth-type MAC CE is MAC CE in NR.

(6) A descending order of priority is preset as: signaling radio bearer, fifth-type MAC CE, and data radio bearer.

The fifth-type MAC CE may be MAC CE in LTE, NR, or the like.

In addition, it should be pointed out that, for the first-type MAC CE to the fifth-type MAC CE, different types of MAC CEs may be MAC CEs transmitted through different interfaces. For example, the first-type MAC CE is MAC CE transmitted through a Uu interface, and the second-type MAC CE is MAC CE transmitted through a PC5 interface. Alternatively, the third-type MAC CE is MAC CE transmitted through a PC5 interface, and the fourth-type MAC CE is MAC CE transmitted through a Uu interface.

Alternatively, different types of MAC CEs may be MAC CEs that are used for different purposes and that are transmitted through a same interface. For example, the first-type MAC CE is MAC CE for CSI report; the second-type MAC CE is MAC CE for CSI control, or MAC CE for CSI activation or CSI deactivation.

Optionally, the first priority corresponding to the first information may be any one of the following:

(1) a priority of a PQI corresponding to the first information;

(2) a PFI corresponding to the first information;

(3) a priority indicated by an application layer and corresponding to the first information;

(4) a priority in a QoS parameter corresponding to the first information;

(5) a priority of a logical channel corresponding to the first information;

(6) a priority of a bearer corresponding to the first information; and (7) a fixed priority specified by a protocol.

The PQI corresponding to the first information in (1) may be a PQI directly corresponding to the first information, or may be a PQI corresponding to a logical channel or bearer on which the first information is located. The PFI corresponding to the first information in (2) may be a PFI directly corresponding to the first information, or may be a PFI corresponding to a logical channel or bearer on which the first information is located. The priority indicated by the application layer and corresponding to the first information in (3) may be a priority directly corresponding to the first information, or may be a priority corresponding to a logical channel or bearer on which the first information is located. The QoS parameter corresponding to the first information in (4) may be a QoS parameter directly corresponding to the first information, or may be a QoS parameter corresponding to a logical channel or bearer on which the first information is located.

In an embodiment, when UE performs NR sidelink communication, for a to-be-transmitted data packet (that is, the first information), the SCI may carry a priority indicated by an upper layer of the UE, and the priority is a priority level (for example, a value of Priority Level) in a PQI corresponding to the to-be-transmitted data packet associated with the SCI, or a priority indicated by the application layer and corresponding to the to-be-transmitted data packet, or a priority level in a QoS parameter corresponding to the to-be-transmitted data packet.

In another embodiment, when UE performs NR sidelink communication, for a to-be-transmitted data packet (that is, the first information), an upper layer of the UE indicates a priority to a physical layer, where the priority is a priority of a logical channel on which the to-be-transmitted data packet is located, or a priority of a bearer corresponding to the to-be-transmitted data packet. When transmitting SCI corresponding to the to-be-transmitted data packet, the physical layer adds the priority into the SCI.

Further, in this embodiment, before the upper layer of the UE indicates the priority to the physical layer, the UE may obtain at least one of the following configurations from a base station or pre-configurations: the priority of the logical channel, the priority of the bearer, a mapping relationship between the logical channel and the PFI, a mapping relationship between the bearer and the PFI, a mapping relationship between the logical channel and the QoS parameter, and a mapping relationship between the bearer and the QoS parameter, so as to indicate the corresponding priority. The obtaining a configuration from a base station may be understood as receiving, by the UE, dedicated signaling or a system message from the base station, where the dedicated signaling or system message includes the corresponding configuration.

Optionally, the dedicated priority may be any one of the following:
- indicated by an upper layer of the terminal to a physical layer;
- configured by a network device; and
- pre-configured; for example, specified by a protocol.

(I) In a case that the dedicated priority is indicated to the physical layer by the upper layer of the terminal, that is, the dedicated priority is determined by the upper layer of the terminal, the dedicated priority may be determined based on at least one of the following:
- (a) a PQI corresponding to the first information;
- (b) a priority indicated by an application layer and corresponding to the first information;
- (c) a QoS parameter corresponding to the first information; for example, the QoS parameter may be a complete set of QoS parameters;
- (d) a PFI corresponding to the first information;
- (e) a priority of a logical channel corresponding to the first information;
- (f) a priority of a bearer corresponding to the first information; and
- (g) a fixed priority specified by a protocol.

It should be noted that the determining based on at least one of the following in (I) can be understood as: the upper layer of the terminal generates a dedicated priority based on at least one of the following and based on terminal implementation or a predefined rule. The predefined rule may be a prescribed function or mapping relationship. For example, when the PFI is equal to x and the priority of the logical channel is equal to y, the dedicated priority is z.

The PQI corresponding to the first information in (a) may be a PQI directly corresponding to the first information, or may be a PQI corresponding to a logical channel or bearer on which the first information is located. The priority indicated by the application layer and corresponding to the first information in (b) may be a priority directly corresponding to the first information, or may be a priority corresponding to a logical channel or bearer on which the first information is located. The QoS parameter corresponding to the first information in (c) may be a QoS parameter directly corresponding to the first information, or may be a QoS parameter corresponding to a logical channel or bearer on which the first information is located. The PFI corresponding to the first information in (d) may be a PFI directly corresponding to the first information, or may be a PFI corresponding to a logical channel or bearer on which the first information is located.

In an embodiment, the upper layer of the terminal may generate a new dedicated priority different from the existing one based on terminal implementation or a predefined rule and at least one of the foregoing (a) to (f), and indicate the new dedicated priority to the physical layer, which is added by the physical layer to the SCI.

In an embodiment, when the upper layer of the terminal determines a dedicated priority based on the priority of the logical channel, if the number of the determined dedicated priorities exceeds 8, the upper layer can normalize the dedicated priorities to obtain eight 3-bit values, and indicate the values to the physical layer. In another embodiment, when the upper layer of the terminal determines a dedicated priority based on the priority of the bearer, if the number of the determined dedicated priorities exceeds 8, the upper layer can normalize the dedicated priorities to obtain eight 3-bit values, and indicate the values to the physical layer.

Further, in a case that the dedicated priority is determined based on the priority of the logical channel corresponding to the first information, the dedicated priority is obtained by processing, in a preset processing manner, the priority of the logical channel corresponding to the first information; or in a case that the dedicated priority is determined based on the priority of the bearer corresponding to the first information, the dedicated priority is obtained by processing, in a preset processing manner, the priority of the bearer corresponding to the first information.

The preset processing manner is optionally a preset mapping relationship, a preset processing function, or the like. In an embodiment, if the number of priorities of the logical channel or bearer is 16, eight dedicated priorities can be obtained correspondingly after the 16 priorities are processed based on the preset mapping relationship. For example, when the priority of the logical channel or bearer is 0 or 1, a corresponding dedicated priority is 0; when the priority of the logical channel or bearer is 2 or 3, a corresponding dedicated priority is 1; and so on. When the number of priorities of logical channels or bearers is inconsistent with the number of dedicated priorities to be determined, corresponding processing can be performed based on the preset mapping relationship. The processing may be mapping a priority value of each logical channel or bearer to a dedicated priority value.

In another embodiment, the priority of the logical channel or bearer is input into the preset processing function, and a corresponding dedicated priority can be output.

The preset mapping relationship or the preset processing function is configured by a network side or pre-configured, or specified by a protocol.

(II) In a case that the dedicated priority is configured by the network device or pre-configured, the dedicated priority may be any one of the following:
- (a) a priority carried in SCI when the physical layer is transmitting the SCI;
- (b) a priority of a logical channel corresponding to the first information; and
- (c) a priority of a bearer corresponding to the first information.

In this embodiment of the present invention, the same terminal may have information (for example, data or signaling) of a first RAT (for example, LTE) to be transmitted/received, and also have information (for example, data or signaling) of a second RAT (for example, NR) to be transmitted/received. In a case that the terminal capability does not support simultaneous transmission/reception of information of the first RAT and information of the second RAT, the terminal may preferentially transmit/receive higher-priority information.

Optionally, in a case that the first information and the second information need to be transmitted/received simultaneously, the foregoing step 102 may include:
preferentially transmitting/receiving higher-priority information in the first information and the second information.

A RAT corresponding to the first information and a RAT corresponding to the second information may be the same or different.

In an embodiment, the RAT corresponding to the first information is NR, and the RAT corresponding to the second information is LTE. In another embodiment, the RAT corresponding to the first information is NR, and the RAT corresponding to the second information is NR.

Optionally, the second information may include any one of the following: sidelink data, PC5 MAC CE, PC5 discovery related message, PC5 synchronization related message, PC5-RRC message, PC5-S message, Uu data, Uu MAC CE, Uu RRC message, and the like.

For a priority of the second information, if the RAT corresponding to the second information is NR, the priority of the second information may be determined by using the foregoing related method for determining the priority of the first information. In a case that the RAT corresponding to the second information is LTE, if the second information is data, the priority of the second information is optionally PPPP or PPPR; and if the second information is other information different from data, such as a MAC CE or an LTE synchronization related message, the priority of the second information may still be determined by using the foregoing related method for determining the priority of the first information.

For example, scenarios to which this embodiment is applied include but are not limited to: (a) simultaneously transmitting/receiving an LTE sidelink data packet (SL data packet for short) and an NR SL data packet; (b) simultaneously transmitting/receiving an NR uplink UL data packet and an NR SL data packet; (c) simultaneously transmitting/receiving an LTE SL data packet and an NR PC5 MAC CE; (d) simultaneously transmitting/receiving an LTE SL data packet and an NR PC5-RRC message; (e) simultaneously transmitting/receiving an LTE SL data packet and an NR PC5-S message; and the like.

It can be understood that the case of transmitting/receiving the first information and the second information simultaneously may be any one of the following:
  I. transmitting first information and transmitting the second information simultaneously;
  II. transmitting first information and receiving the second information simultaneously;
  III. receiving first information and transmitting the second information simultaneously; and
  IV. receiving first information and receiving the second information simultaneously.

In this embodiment, the higher-priority information is determined by using at least one of the following:

(1) Direct comparison method, that is, comparing the priority of the first information and the priority of the second information.

A case to which (1) is applied is: The number of priorities of the first information is equal to the number of priorities of the second information, and/or the priorities of the first information and second information have the same meaning.

For example, the number of PPPPs in LTE is 8, with 3 bits in total. If the number of priority values in NR is also 8, the direct comparison method in (1) can be used. The comparison method is that, for example, if a priority value A of LTE information is smaller than a priority value B of NR information, it is determined that the priority of the LTE information is higher than the priority of the NR information.

It should be noted that in (1), for example, a smaller priority value corresponds to a higher priority. If a comparison result is that the priorities of the first information and second information are the same, information to be transmitted/received preferentially may be determined based on terminal implementation or a predefined rule.

(2) Direct comparison method, that is, comparing a second priority and first mapping information based on a preset corresponding relationship between priorities and mapping information.

The second priority is the priority of the first information, and the first mapping information is obtained by mapping the priority of the second information; or the second priority is the priority of the second information, and the first mapping information is obtained by mapping the priority of the first information. The mapping information in (2) may be a priority value or a priority value range.

A case to which (2) is applied may be: The number of priorities of the first information is not equal to the number of priorities of the second information, and/or the priority values of the first information and second information have different meanings. The specific mapping method in (2) may be any one of the following: specified by a protocol, decided by the upper layer of the terminal, configured by a network, pre-configured, and the like.

For example, the number of PPPPs in LTE is 8, with 3 bits in total. If the number of priority values in NR is not 8, for example, the number of priority values in NR is 16 (0 to 15), the priority values in NR need to be mapped first, and then are compared with priority values in LTE.

For example, a comparison method is as follows: It is assumed that when a priority value in NR is equal to 0 or 1, the priority value corresponds to a mapping range 1, that when a priority value in NR is equal to 2 or 3, the priority value corresponds to a mapping range 2, . . . . If a priority value of NR information is preset to be within the mapping range 1 and a priority value of LTE information is 0, the LTE information and NR information have the same priorities; or if the priority value of the NR information is 3, that is, falls in the mapping range 2, and the priority value of the LTE information is 0, the priority of the LTE information is higher than the priority of the NR information.

For example, another comparison method is as follows: It is assumed that when a priority value in NR is equal to 0, 1, or 2, the priority value corresponds to a mapping range 1, that when a priority value in NR is equal to 3, the priority value corresponds to a mapping range 2, . . . . If a priority value of NR information is preset to be within the mapping range 1 and a priority value of LTE information is 0, the NR information and LTE information have the same priorities; if a priority value of NR information is preset to be within the mapping range 2 and a priority value of LTE information is 1, the NR information and LTE information have the same priorities; or if the priority value of the NR information is 0, that is, falls in the mapping range 1, and the priority value of the LTE information is 1, the priority of the NR information is higher than the priority of the LTE information.

In addition, except for a case that the priority value ranges are different, in a case that both the number of priority values in LTE and the number of priority values in NR are 8, because the meanings of the priority values in LTE and NR may be different, direct comparison may be performed after mapping processing. For example, when a priority value of NR information is equal to 0 or 1 and a priority value of LTE information is 2, the NR information and LTE information have the same priorities.

(3) Single threshold comparison method, that is, comparing the priority of the first information with a third threshold, or comparing the priority of the second information with a fourth threshold.

In (3), instead of directly comparing the priority of the first information with the priority of the second information, the priorities of the first information and second information are determined by comparing a priority of one of the first information and the second information with a threshold.

Optionally, the third threshold may be any one of the following: specified by a protocol, decided by the upper layer of the terminal, configured by a network, pre-configured, and the like. The fourth threshold may be any one of the following: specified by a protocol, decided by the upper layer of the terminal, configured by a network, pre-configured, and the like. The third threshold and the fourth threshold may be the same or different, depending on an actual case.

For example, a priority value of LTE information is compared with a threshold A. If the priority value of the LTE information is smaller than the threshold A, a priority of the LTE information is higher, and the LTE information is preferentially transmitted/received; otherwise, if the priority value of the LTE information is larger than the threshold A, the priority of the LTE information is lower, and NR information is preferentially transmitted/received.

For another example, a priority value of NR information is compared with a threshold B. If the priority value of the NR information is smaller than the threshold B, a priority of the NR information is higher, and the NR information is preferentially transmitted/received; otherwise, if the priority value of the NR information is larger than the threshold B, the priority of the NR information is lower, and LTE information is preferentially transmitted/received.

(4) Double threshold comparison method, that is, comparing the priority of the first information with a first threshold, and comparing the priority of the second information with a second threshold.

In (4), two thresholds (namely, the first threshold and the second threshold) may be defined, and correspond to the priority of the first information and the priority of the second information, respectively.

Optionally, the first threshold may be any one of the following: specified by a protocol, decided by the upper layer of the terminal, configured by a network, pre-configured, and the like. The second threshold may be any one of the following: specified by a protocol, decided by the upper layer of the terminal, configured by a network, pre-configured, and the like. The first threshold and the second threshold may be the same or different, depending on an actual case.

For example, an LTE data packet and an NR data packet are used as an example, and the implementation schemes in (4) may include but are not limited to the following:

Scheme 1 (two-stage threshold):
if a priority value of the NR data packet is smaller than a threshold 1, the NR data packet is preferentially transmitted/received;
or else (the priority value of the NR packet is not smaller than the threshold 1):
if a priority value of the LTE data packet is smaller than a threshold 2, the LTE data packet is preferentially transmitted/received;
otherwise (the priority value of the LTE data packet is not smaller than the threshold 2), the NR data packet is preferentially transmitted/received.

Scheme 2 (two-stage threshold):
if a priority value of the LTE data packet is smaller than a threshold 2, the LTE data packet is preferentially transmitted/received;
or else (the priority value of the LTE packet is not smaller than the threshold 2):
if a priority value of the NR data packet is smaller than a threshold 1, the NR data packet is preferentially transmitted/received;
otherwise (the priority value of the NR data packet is not smaller than the threshold 1), the LTE data packet is preferentially transmitted/received.

Scheme 3 (comprehensive consideration):
if a priority value of the LTE data packet is smaller than a threshold 2, and a priority value of the NR data packet is larger than a threshold 1, the LTE data packet is preferentially transmitted/received;
otherwise, the NR packet is preferentially transmitted/received.

Scheme 4 (comprehensive consideration):
if a priority value of the LTE data packet is larger than a threshold 2, and a priority value of the NR data packet is smaller than a threshold 1, the NR data packet is preferentially transmitted/received;
otherwise, the LTE packet is preferentially transmitted/received.

Scheme 5 (comprehensive consideration):
if a priority value of the LTE data packet is smaller than a threshold 2, and a priority value of the NR data packet is larger than a threshold 1, the LTE data packet is preferentially transmitted/received;
if a priority value of the LTE data packet is larger than a threshold 2, and a priority value of the NR data packet is smaller than a threshold 1, the NR data packet is preferentially transmitted/received; and
in other cases, a priority of the LTE data packet and a priority of NR data packet are determined by the terminal.

It should be noted that in the foregoing schemes 1 to 5, the expression used is that a priority value is smaller than a threshold X, but the actual meaning of this expression is that a priority is higher than the threshold X. That is, the assumption herein is that a smaller priority value corresponds to a higher priority. If a larger priority value corresponding to a higher priority is used subsequently, the expressions in the foregoing schemes 1 to 5 should be modified accordingly.

(5) Presetting a priority order
For example, an LTE data packet and an NR data packet are used as an example, and a preset priority order (in descending order) may be: NR data packet and LTE data packet.

In this embodiment of the present invention, information of which RAT is to be preferentially transmitted/received is determined based on the priority, and a hybrid automatic repeat request (HARQ) process may be preempted. For example, the number of HARQ transmission and/or reception processes of the terminal may be limited, for example, up to 16. For a pair of terminals, when a transmitting terminal transmits data that requires a HARQ feedback, the transmitting terminal occupies a HARQ process, and when a receiving terminal receives the data, the receiving terminal occupies a HARQ process. However, the receiving terminal may receive data transmitted by a plurality of terminals simultaneously. When a priority of data B received by the receiving terminal is higher than a priority of previously received data A, a possible implementation method is that the receiving terminal drops a HARQ process of the data A and leaves the corresponding HARQ process for the data B to use.

Optionally, in a case that the first information and the second information correspond to different HARQ processes, the preferentially transmitting/receiving higher-priority information in the first information and the second information may specifically be: transmitting/receiving the higher-priority information by using a first HARQ process, where the first HARQ process corresponds to the higher-priority information.

Further, the method further includes: dropping a second HARQ process, where the second HARQ process corresponds to lower-priority information in the first information and the second information. In this way, preferential transmission/reception of important information can be ensured, so that overall performance of a communications system is better.

In addition, the terminal may also determine, based on a priority of received information (for example, signaling or data), how many HARQ processes it can support at most. For example, when the priority is equal to 4, up to three HARQ processes are used, or when the priority is equal to 2, up to four HARQ processes are used, and remaining HARQ processes are retained for possible higher-priority data or other messages. The number of HARQ processes that can be supported for different priorities may be configured by a network, pre-configured, specified by a protocol, or implemented by a terminal.

The following describes in detail the data transmission/reception process of this embodiment of the present invention by using simultaneous transmission/reception of an LTE data packet and an NR data packet as an example.

Embodiment 1

In Embodiment 1, when being compared with a priority of the LTE data packet, a priority of the NR data packet may be a priority (for example, a value of default priority level Default Priority Level) in a PQI corresponding to a logical channel or bearer on which the NR data packet is transceived (that is, transmitted or received), and so on. A corresponding data transmission/reception procedure includes the following steps:

Step 1-1: When UE performs NR sidelink communication, add a priority indicated by an upper layer of the UE into SCI, where the priority is a priority in a PQI corresponding to a to-be-transmitted data packet associated with the SCI, or a priority indicated by an application layer and corresponding to a to-be-transmitted data packet, or a priority level in a QoS parameter corresponding to a to-be-transmitted data packet.

Step 1-21: When the UE needs to transmit the LTE data packet and the NR data packet simultaneously, compare the priority of the LTE data packet with the priority of the NR data packet (that is, a priority in NR SCI), and preferentially transmit a higher-priority data packet.

Step 1-22: When the UE needs to transmit the LTE data packet and receive the NR data packet simultaneously, compare the priority of the LTE data packet with the priority of the NR data packet (that is, a priority in NR SCI), and preferentially process (that is, transmit or receive) a higher-priority data packet.

Step 1-23: When the UE needs to receive the LTE data packet and transmit the NR data packet simultaneously, compare the priority of the LTE data packet with the priority of the NR data packet (that is, a priority in NR SCI), and preferentially process (that is, transmit or receive) a higher-priority data packet.

Step 1-24: When the UE needs to receive the LTE data packet and the NR data packet simultaneously, compare the priority of the LTE data packet with the priority of the NR data packet (that is, a priority in NR SCI), and preferentially receive a higher-priority data packet.

For the foregoing steps 1-21 to 1-24, when the priority of the LTE data packet is compared with the priority of the NR data packet, any one of the comparison methods (for example, direct comparison method) in the embodiment shown in FIG. 1 may be used for comparison. The priority of the NR data packet is the priority indicated by the upper layer in the foregoing step 1-1. The priority of the LTE data packet may be a PPPP, a PPPR, or another defined priority, such as a priority of a logical channel.

Embodiment 2

In Embodiment 2, when being compared with a priority of the LTE data packet, a priority of the NR data packet may be a priority of a logical channel or bearer on which the NR data packet is transceived (that is, transmitted or received). A corresponding data transmission/reception procedure includes the following steps:

Step 2-1: The UE obtains at least one of the following configurations from a base station or pre-configuration:
(1) a priority of the logical channel or bearer;
(2) a mapping relationship between the logical channel or bearer and a PFI; and
(3) a mapping relationship between the logical channel or bearer and a QoS parameter.

The obtaining a configuration from a base station may mean that the UE receives dedicated signaling or a system message from the base station, where the dedicated signaling or system message carries the corresponding configuration.

Step 2-2: When UE performs NR sidelink communication, an upper layer indicates a priority to a physical layer, where the priority is a priority of a logical channel or bearer corresponding to a to-be-transmitted data packet.

Step 2-3: When transmitting SCI corresponding to the to-be-transmitted data packet, the physical layer of the UE adds the priority in step 2-2 into the SCI.

Step 2-41 to Step 2-44 are the same as Step 1-21 to Step 1-24 in Embodiment 1.

Embodiment 3

In Embodiment 3, when compared with a priority of the LTE data packet, a priority of the NR data packet may be a dedicated priority indicated by an upper layer to a physical layer when the NR data packet is being transmitted/received, where the dedicated priority is configured by a base station or pre-configured. A corresponding data transmission/reception procedure includes the following steps:

Step 3-1: The UE obtains at least one of the following configurations from a base station or pre-configuration:
(1) a priority of the logical channel or bearer;
(2) a mapping relationship between the logical channel or bearer and a PFI;
(3) a mapping relationship between the logical channel or bearer and a QoS parameter; and
(4) a priority carried in SCI when the physical layer is transmitting the SCI.

The obtaining a configuration from a base station may mean that the UE receives dedicated signaling or a system message from the base station, where the dedicated signaling or system message carries the corresponding configuration.

Step 3-2: When UE performs NR sidelink communication, an upper layer indicates a priority to a physical layer, where the priority is the priority that is carried in the SCI when the SCI is transmitted by the physical layer in step 3-1 and that corresponds to a to-be-transmitted data packet.

Step 3-3: When transmitting SCI corresponding to the to-be-transmitted data packet, the physical layer of the UE adds the priority in step 3-2 into the SCI.

Step 3-41 to Step 3-44 are the same as Step 1-21 to Step 1-24 in Embodiment 1. Preferably, the comparison method is a direct comparison method.

Embodiment 4

In Embodiment 4, when being compared with a priority of the LTE data packet, a priority of the NR data packet may be a dedicated priority indicated by an upper layer to a physical layer when the NR data packet is being transmitted/received, where the dedicated priority is determined by the UE itself. A corresponding data transmission/reception procedure includes the following steps:

Step 4-1: The UE obtains at least one of the following configurations from a base station or pre-configuration:
(1) a priority of the logical channel or bearer;
(2) a mapping relationship between the logical channel or bearer and a PFI; and
(3) a mapping relationship between the logical channel or bearer and a QoS parameter.

The obtaining a configuration from a base station may mean that the UE receives dedicated signaling or a system message from the base station, where the dedicated signaling or system message carries the corresponding configuration.

Step 4-2: When UE performs NR sidelink communication, an upper layer indicates a priority to a physical layer, where the priority is determined by the upper layer of the UE.

The upper layer of the UE may determine the priority to be indicated to the physical layer, based on at least one of the following:
a PQI corresponding to a to-be-transmitted data packet;
a priority indicated by an application layer and corresponding to a to-be-transmitted data packet;
a QoS parameter corresponding to a to-be-transmitted data packet;
a PFI corresponding to a to-be-transmitted data packet; and
a priority of a logical channel or bearer on which a to-be-transmitted data packet is located.

Step 4-3: When transmitting SCI corresponding to the to-be-transmitted data packet, the physical layer of the UE adds the priority in step 4-2 into the SCI.

Step 4-41 to Step 4-44 are the same as Step 1-21 to Step 1-24 in Embodiment 1. Preferably, the comparison method is the foregoing direct comparison method.

Embodiment 5

In Embodiment 5, when being compared with a priority of the LTE data packet, a priority of the NR data packet may be a corresponding PQI or PFI (that is, a PQI or PFI corresponding to a logical channel or bearer on which the NR data packet is located) when the NR data packet is being transmitted/received. A corresponding data transmission/reception procedure includes the following steps:

Step 5-1: When UE performs NR sidelink communication, add a priority indicated by an upper layer into SCI, where the priority is a PQI corresponding to a to-be-transmitted data packet associated with the SCI or a PFI corresponding to a to-be-transmitted data packet.

Step 5-21 to Step 5-24 are the same as Step 1-21 to Step 1-24 in Embodiment 1.

It should be noted that the foregoing Embodiment 1 to Embodiment 5 are described by using the simultaneous transmission/reception of an LTE data packet and an NR data packet as an example. However, in a case that an LTE MAC CE or an NR MAC CE, an LTE PC5 discovery related message or an NR PC5 discovery related message, an LTE PC5-RRC message or an NR PC5-RRC message, an LTE PC5-S message or an NR PC5-S message, and the like have corresponding priorities, an LTE data packet and an NR MAC CE may be simultaneously transmitted/received, or the LTE PC5-RRC message and the NR PC5-RRC message may be simultaneously transmitted/received, or an LTE data packet and the NR PC5-S message may be simultaneously transmitted/received, and so on. Information priority comparison procedures and transmission/reception procedures are similar, which are not repeated herein.

The foregoing embodiment describes the information processing method in the present invention, and the following describes a terminal in the present invention with reference to the embodiments and the accompanying drawings.

Figure 2:
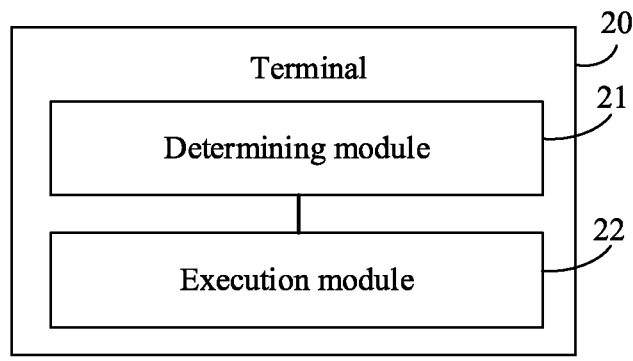
FIG. 2 is a first schematic structural diagram of a terminal according to an embodiment of the present invention.

Referring to FIG. 2, FIG. 2 is a structural diagram of a terminal according to an embodiment of the present invention. As shown in FIG. 2, the terminal 20 includes:
a determining module 21, configured to determine a priority of first information; and
an execution module 22, configured to perform, based on the priority of the first information, an operation associated with the priority of the first information.

The priority of the first information is a first priority corresponding to the first information or a dedicated priority; or the priority of the first information is determined according to a predefined rule.

Optionally, a RAT corresponding to the first information may be NR, a communications technology of a later version, or the like, which is not limited in this embodiment.

In an embodiment, when the RAT corresponding to the first information is NR, the priority of the first information is priority indication carried in NR SCI.

Optionally, the first information includes any one of the following:
a. sidelink data, PC5 MAC CE, PC5 discovery related message, PC5 synchronization related message, PC5-RRC message, and PC5-S message.

Optionally, the first priority corresponding to the first information is any one of the following:
a priority of a PQI corresponding to the first information;
a priority indicated by an application layer and corresponding to the first information;
a priority in a QoS parameter corresponding to the first information;
a priority of a logical channel corresponding to the first information;
a priority of a bearer corresponding to the first information;
a PFI corresponding to the first information; and
a fixed priority specified by a protocol.

Optionally, the dedicated priority is any one of the following:
indicated by an upper layer of the terminal to a physical layer;
configured by a network device; and
pre-configured.

Optionally, in a case that the dedicated priority is indicated by the upper layer of the terminal to the physical layer, the dedicated priority is determined based on at least one of the following:
a PQI corresponding to the first information;
a priority indicated by an application layer and corresponding to the first information;
a QoS parameter corresponding to the first information;
a PFI corresponding to the first information;
a priority of a logical channel corresponding to the first information;
a priority of a bearer corresponding to the first information; and
a fixed priority specified by a protocol.

Optionally, in a case that the dedicated priority is determined based on the priority of the logical channel corresponding to the first information, the dedicated priority is obtained by processing, in a preset processing manner, the priority of the logical channel corresponding to the first information.

Alternatively, in a case that the dedicated priority is determined based on the priority of the bearer corresponding to the first information, the dedicated priority is obtained by processing, in a preset processing manner, the priority of the bearer corresponding to the first information.

Optionally, in a case that the dedicated priority is configured by the network device or pre-configured, the dedicated priority is any one of the following:
a priority carried in SCI when the physical layer is transmitting the SCI;
a priority of a logical channel corresponding to the first information; and
a priority of a bearer corresponding to the first information.

Optionally, the execution module 22 may be configured to: in a case that the first information and the second information need to be transmitted/received simultaneously, preferentially transmit/receive higher-priority information in the first information and the second information.

Optionally, the second information includes any one of the following:
sidelink data, PC5 MAC CE, PC5 discovery related message, PC5 synchronization related message, PC5-RRC message, PC5-S message, Uu data, Uu MAC CE, and Uu RRC message.

Optionally, the higher-priority information is determined by using at least one of the following:
comparing the priority of the first information with a priority of the second information;
comparing a second priority with first mapping information based on a preset correspondence between preset priorities and mapping information, where the second priority is the priority of the first information, and the first mapping information is obtained by mapping a priority of the second information; or the second priority is a priority of the second information, and the first mapping information is obtained by mapping the priority of the first information;
comparing the priority of the first information with a first threshold, and comparing a priority of the second information with a second threshold;
comparing the priority of the first information with a third threshold;
comparing a priority of the second information with a fourth threshold; and
presetting a priority order.

Optionally, in a case that the first information and the second information correspond to different HARQ processes, the execution module 22 may be further configured to:
transmit/receive the higher-priority information by using a first HARQ process, where the first HARQ process corresponds to the higher-priority information; and
drop a second HARQ process, where the second HARQ process corresponds to lower-priority information in the first information and the second information.

Optionally, the predefined rule includes any one of the following:
that a PC5 synchronization related message has a highest priority;
priorities of a MAC CE and a signaling radio bearer being higher than a priority of a data radio bearer;
a priority of a first-type MAC CE being higher than a priority of a second-type MAC CE;
a priority of a first-type signaling radio bearer being higher than a priority of a second-type signaling radio bearer;
a descending order of priority being preset as: third-type MAC CE, signaling radio bearer, fourth-type MAC CE, and data radio bearer; and
a descending order of priority being preset as: signaling radio bearer, fifth-type MAC CE, and data radio bearer.

The terminal 20 of this embodiment of the present invention can implement the processes implemented in the method embodiment shown in FIG. 1, with the same beneficial effects achieved. To avoid repetition, details are not described herein again.

An embodiment of the present invention further provides a terminal, including a processor, a memory, and a computer program stored in the memory and capable of running on the processor, where when the computer program is executed by the processor, the processes in the foregoing method embodiment shown in FIG. 1 are implemented, with the same technical effect achieved. To avoid repetition, details are not described herein again.

Figure 3:
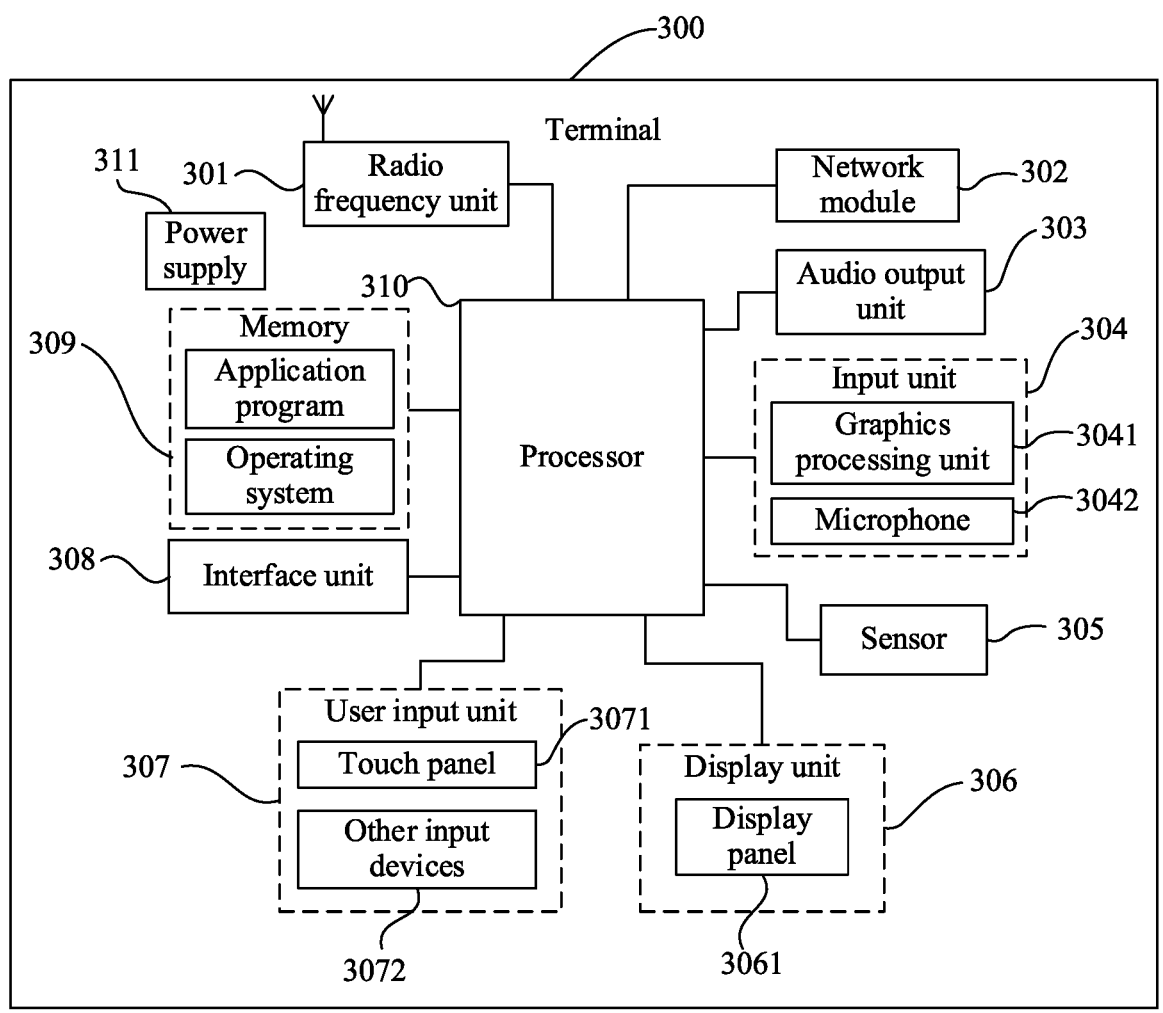
FIG. 3 is a second schematic structural diagram of a terminal according to an embodiment of the present invention.

Specifically, FIG. 3 is a schematic diagram of a hardware structure of a terminal for implementing the embodiments of the present invention. The terminal 300 includes but is not limited to components such as a radio frequency unit 301, a network module 302, an audio output unit 303, an input unit 304, a sensor 305, a display unit 306, a user input unit 307, an interface unit 308, a memory 309, a processor 310, and a power supply 311. Persons skilled in the art can understand that the structure of the terminal shown in FIG. 3 does not constitute any limitation on the terminal, and the terminal may include more or fewer components than shown in the diagram, or some components may be combined, or the components may be arranged in different manners. In this embodiment of the present invention, the terminal includes but is not limited to a mobile phone, a tablet computer, a notebook computer, a palmtop computer, a vehicle-mounted terminal, a wearable device, a pedometer, or the like.

The processor 310 is configured to: determine a priority of first information; and perform, based on the priority of the first information, an operation associated with the priority of the first information; where a RAT corresponding to the first information is NR; and the priority of the first information is a first priority corresponding to the first information or a dedicated priority; or the priority of the first information is determined according to a predefined rule.

The terminal 300 of this embodiment of the present invention can implement the processes implemented in the method embodiment shown in FIG. 1, with the same beneficial effects achieved. To avoid repetition, details are not described herein again.

It should be understood that in this embodiment of the present invention, the radio frequency unit 301 may be configured to receive and transmit signals in an information reception or transmission or call process. Specifically, after receiving downlink data from a base station, the radio frequency unit 301 transmits the downlink data to the processor 310 for processing, and in addition, transmits uplink data to the base station. Generally, the radio frequency unit 301 includes but is not limited to an antenna, at least one amplifier, a transceiver, a coupler, a low noise amplifier, a duplexer, and the like. In addition, the radio frequency unit 301 may also communicate with a network and other devices via a wireless communications system.

The terminal provides a user with wireless broadband Internet access by using the network module 302, for example, helping the user to send or receive e-mails, browse web pages, and access streaming media.

The audio output unit 303 may convert audio data into an audio signal, and output the audio signal as sound, where the audio data is received by the radio frequency unit 301 or the network module 302, or stored in the memory 309. In addition, the audio output unit 303 may further provide audio output (for example, a call signal received tone or a message received tone) that is related to a specific function performed by the terminal 300. The audio output unit 303 includes a speaker, a buzzer, a receiver, and the like.

The input unit 304 is configured to receive an audio or video signal. The input unit 304 may include a graphics processing unit (GPU) 3041 and a microphone 3042, and the graphics processing unit 3041 processes image data of a still picture or a video obtained by an image capture apparatus (for example, a camera) in an image capture mode or a video capture mode. A processed image frame may be displayed on the display unit 306. The image frame processed by the graphics processing unit 3041 may be stored in the memory 309 (or another storage medium) or transmitted by using the radio frequency unit 301 or the network module 302. The microphone 3042 can receive sounds and process such sounds into audio data. The processed audio data can be converted in a telephone call mode into a format that can be transmitted by the radio frequency unit 301 to a mobile communication base station, for outputting.

The terminal 300 may further include at least one sensor 305, for example, an optical sensor, a motion sensor, and other sensors. Specifically, the optical sensor may include an ambient light sensor and a proximity sensor. The ambient light sensor may adjust luminance of the display panel 3061 based on brightness of ambient light, and the proximity sensor may turn off the display panel 3061 and/or backlight when the terminal 300 moves close to an ear. As a motion sensor, an accelerometer sensor may detect magnitudes of accelerations in various directions (typically three axes), and in a stationary state, may detect the magnitude and direction of gravity, and may be applied for terminal posture recognition (for example, switching between a landscape orientation and a portrait orientation), related gaming, and magnetometer posture calibration), vibration recognition related functions (for example, pedometer and tapping), and the like. The sensor 305 may further include a fingerprint sensor, a pressure sensor, an iris sensor, a molecular sensor, a gyroscope, a barometer, a hygrometer, a thermometer, an infrared sensor, and the like. Details are not described herein.

The display unit 306 is configured to display information input by the user or information provided to the user. The display unit 306 may include the display panel 3061. The display panel 3061 may be configured in a form of a liquid crystal display (LCD), an organic light-emitting diode (OLED), or the like.

The user input unit 307 may be configured to receive input digit or character information, and generate a key signal input related to a user setting and function control of the terminal. Specifically, the user input unit 307 includes a touch panel 3071 and other input devices 3072. The touch panel 3071, or referred to as a touchscreen, may capture a touch operation performed by a user on or near the touch panel 3071 (for example, an operation performed by the user on the touch panel 3071 or near the touch panel 3071 by using any appropriate object or accessory such as a finger or a stylus). The touch panel 3071 may include two parts: a touch detection apparatus and a touch controller. The touch detection apparatus detects a touch direction of a user, detects a signal brought by a touch operation, and transmits the signal to the touch controller. The touch controller receives touch information from the touch detection apparatus, converts the touch information into touchpoint coordinates, transmits the touchpoint coordinates to the processor 310, and receives and executes a command transmitted by the processor 310. In addition, the touch panel 3071 may be implemented in a plurality of forms, for example, as a resistive, capacitive, infrared, or surface acoustic wave touch panel. In addition to the touch panel 3071, the user input unit 307 may further include other input devices 3072. Specifically, the other input devices 3072 may include but are not limited to a physical keyboard, a function key (for example, a volume control key or a switch key), a trackball, a mouse, and a joystick. Details are not described herein.

Further, the touch panel 3071 may cover the display panel 3061. After detecting a touch operation on or near the touch panel 3071, the touch panel 3071 transmits the touch operation to the processor 310 to determine a type of a touch event. Then the processor 310 provides corresponding visual output on the display panel 3061 based on the type of the touch event. In FIG. 3, the touch panel 3071 and the display panel 3061 serve as two separate components to implement input and output functions of the terminal. However, in some embodiments, the touch panel 3071 and the display panel 3061 may be integrated to implement the input and output functions of the terminal. This is not specifically limited herein.

The interface unit 308 is an interface between an external apparatus and the terminal 300. For example, the external apparatus may include a wired or wireless headphone port, an external power (or battery charger) port, a wired or wireless data port, a memory card port, a port for connecting an apparatus provided with a recognition module, an audio input/output (I/O) port, a video I/O port, an earphone port, and the like. The interface unit 308 may be configured to receive an input (for example, data information or power) from an external apparatus, and transmit the received input to one or more components in the terminal 300, or may be configured to transmit data between the terminal 300 and an external apparatus.

The memory 309 may be configured to store software programs and various data. The memory 309 may mainly include a program storage area and a data storage area. The program storage area may store an operating system, an application program required for at least one function (for example, a sound play function and an image play function), and the like. The data storage area may store data created based on use of the mobile phone (for example, audio data and a phone book), and the like. In addition, the memory 309 may include a high-speed random access memory, or may further include a non-volatile memory, for example, at least one magnetic disk storage device, a flash memory, or another volatile solid-state storage device.

The processor 310 is a control center of the terminal, and is connected to all components of the terminal by using various interfaces and lines. By running or executing a software program and/or a module stored in the memory 309 and invoking data stored in the memory 309, the processor 310 executes various functions of the terminal and processes data, so as to perform overall monitoring on the terminal. The processor 310 may include one or more processing units. Preferably, the processor 310 may integrate an application processor and a modem processor. The application processor mainly processes the operating system, a user interface, an application program, and the like. The modem processor mainly processes wireless communication. It can be understood that the modem processor may alternatively be not integrated in the processor 310.

The terminal 300 may further include the power supply 311 (such as a battery) supplying power to each component. Preferably, the power supply 311 may be logically connected to the processor 310 by using a power management system, so that functions such as charge and discharge management and power consumption management are implemented by using the power management system.

In addition, the terminal 300 may further include some functional modules that are not shown. Details are not described herein.

An embodiment of the present invention further provides a computer-readable storage medium, where the computer-readable storage medium stores a computer program, and when the computer program is executed by a processor, the processes of the foregoing method embodiment shown in FIG. 1 may be implemented, with the same technical effects achieved. To avoid repetition, details are not described herein again. The computer-readable storage medium may be, for example, a read-only memory (ROM), a random access memory (RAM), a magnetic disk, or an optical disc.

It should be noted that in this specification, the terms "include" and "comprise", or any of their variants are intended to cover a non-exclusive inclusion, such that a process, a method, an article, or an apparatus that includes a list of elements not only includes those elements but also includes other elements that are not expressly listed, or further includes elements inherent to such a process, method, article, or apparatus. In absence of more constraints, an element preceded by "includes a . . . " does not preclude the existence of other identical elements in the process, method, article, or apparatus that includes the element.

According to the description of the foregoing embodiments, persons skilled in the art can clearly understand that the method in the foregoing embodiments may be implemented by software in addition to a necessary universal hardware platform or by hardware only. In most cases, the former is a preferred implementation. Based on such an understanding, the technical solutions of the present invention essentially, or the part contributing to the prior art may be implemented in a form of a software product. The software product is stored in a storage medium (for example, ROM/RAM, a magnetic disk, or an optical disc), and includes several instructions for instructing a terminal (which may be a mobile phone, a computer, a server, an air conditioner, a network device, or the like) to perform the method described in the embodiments of the present invention.

The embodiments of the present invention are described above with reference to the accompanying drawings, but the present invention is not limited to the foregoing implementations. The foregoing embodiments are only illustrative rather than restrictive. Inspired by the present invention, persons of ordinary skill in the art can still derive many variations without departing from the essence of the present invention and the protection scope of the claims. All these variations shall fall within the protection of the present invention.

What is claimed is:

1. An information processing method, performed by a terminal and comprising:
    determining a priority of first information; and
    performing, based on the priority of the first information, an operation associated with the priority of the first information; wherein
    a radio access technology (RAT) corresponding to the first information is new radio (NR); and
    the priority of the first information is a first priority corresponding to the first information or a dedicated priority; or the priority of the first information is determined according to a predefined rule;
    wherein in a case that the first information and second information need to be transmitted/received simultaneously, the performing, based on the priority of the first information, an operation associated with the priority of the first information comprises:
    preferentially transmitting/receiving higher-priority information in the first information and the second information;
    wherein in a case that the first information and the second information correspond to different hybrid automatic repeat request t (HARQ) processes, the preferentially transmitting/receiving higher-priority information in the first information and the second information comprises:
    transmitting/receiving the higher-priority information by using a first HARQ process, wherein the first HARQ process corresponds to the higher-priority information; and
    the method further comprises:
    dropping a second HARQ process, wherein the second HARQ process corresponds to lower-priority information in the first information and the second information.

2. The method according to claim 1, wherein the first priority corresponding to the first information is any one of the following:
    a priority in a PC5 quality of service indicator (PQI) corresponding to the first information;
    a priority indicated by an application layer and corresponding to the first information;
    a priority in a quality of service (QOS) parameter corresponding to the first information;
    a priority of a logical channel corresponding to the first information;
    a priority of a bearer corresponding to the first information;
    a PC5 quality of service flow indicator (PFI) corresponding to the first information; and
    a fixed priority specified by a protocol.

3. The method according to claim 1, wherein the dedicated priority is any one of the following:

indicated by an upper layer of the terminal to a physical layer;
configured by a network device; and
pre-configured.

4. The method according to claim 3, wherein in a case that the dedicated priority is indicated by the upper layer of the terminal to the physical layer, the dedicated priority is determined based on at least one of the following:
a PQI corresponding to the first information;
a priority indicated by an application layer and corresponding to the first information;
a QoS parameter corresponding to the first information;
a PFI corresponding to the first information;
a priority of a logical channel corresponding to the first information;
a priority of a bearer corresponding to the first information; and
a fixed priority specified by a protocol.

5. The method according to claim 4, wherein in a case that the dedicated priority is determined based on the priority of the logical channel corresponding to the first information, the dedicated priority is obtained by processing, in a preset processing manner, the priority of the logical channel corresponding to the first information;
or
in a case that the dedicated priority is determined based on the priority of the bearer corresponding to the first information, the dedicated priority is obtained by processing, in a preset processing manner, the priority of the bearer corresponding to the first information.

6. The method according to claim 3, wherein in a case that the dedicated priority is configured by the network device or pre-configured, the dedicated priority is any one of the following:
a priority carried in sidelink control information (SCI) when the physical layer is transmitting the SCI;
a priority of a logical channel corresponding to the first information; and
a priority of a bearer corresponding to the first information.

7. The method according to claim 1, wherein the higher-priority information is determined by using at least one of the following:
comparing the priority of the first information with a priority of the second information;
comparing a second priority with first mapping information based on a preset correspondence between preset priorities and mapping information, wherein the second priority is the priority of the first information, and the first mapping information is obtained by mapping a priority of the second information; or the second priority is a priority of the second information, and the first mapping information is obtained by mapping the priority of the first information;
comparing the priority of the first information with a first threshold, and comparing a priority of the second information with a second threshold;
comparing the priority of the first information with a third threshold;
comparing a priority of the second information with a fourth threshold; and
presetting a priority order.

8. The method according to claim 1, wherein the first information comprises any one of the following:
sidelink data, PC5 media access control control element (MAC CE), PC5 discovery related message, PC5 synchronization related message, PC5 radio resource control (RRC) message, and PC5-S message.

9. The method according to claim 1, wherein the second information comprises any one of the following:
sidelink data, PC5 MAC CE, PC5 discovery related message, PC5 synchronization related message, PC5-RRC message, PC5-S message, Uu data, Uu MAC CE, and Uu RRC message.

10. The method according to claim 1, wherein the predefined rule comprises any one of the following:
that a PC5 synchronization related message has a highest priority;
priorities of a MAC CE and a signaling radio bearer being higher than a priority of a data radio bearer;
a priority of a first-type MAC CE being higher than a priority of a second-type MAC CE;
a priority of a first-type signaling radio bearer being higher than a priority of a second-type signaling radio bearer;
a descending order of priority being preset as: third-type MAC CE, signaling radio bearer, fourth-type MAC CE, and data radio bearer; and
a descending order of priority being preset as: signaling radio bearer, fifth-type MAC CE, and data radio bearer.

11. The method according to claim 1, wherein the priority of the first information is indicated by a priority indication carried in NR SCI.

12. A terminal, comprising a memory, a processor, and a computer program stored in the memory and capable of running on the processor, wherein the computer program, when being executed by the processor, implements the steps of:
determining a priority of first information; and
performing, based on the priority of the first information, an operation associated with the priority of the first information; wherein
a radio access technology (RAT) corresponding to the first information is new radio (NR); and
the priority of the first information is a first priority corresponding to the first information or a dedicated priority; or the priority of the first information is determined according to a predefined rule;
wherein in a case that the first information and second information need to be transmitted/received simultaneously, the performing, based on the priority of the first information, an operation associated with the priority of the first information comprises:
preferentially transmitting/receiving higher-priority information in the first information and the second information;
wherein in a case that the first information and the second information correspond to different hybrid automatic repeat request (HARQ) processes, the preferentially transmitting/receiving higher-priority information in the first information and the second information comprises:
transmitting/receiving the higher-priority information by using a first HARQ process, wherein the first HARQ process corresponds to the higher-priority information; and
the method further comprises:
dropping a second HARQ process, wherein the second HARQ process corresponds to lower-priority information in the first information and the second information.

13. The terminal according to claim 12, wherein the first priority corresponding to the first information is any one of the following:

a priority in a PC5 quality of service indicator (PQI) corresponding to the first information;
a priority indicated by an application layer and corresponding to the first information;
a priority in a quality of service (QOS) parameter corresponding to the first information;
a priority of a logical channel corresponding to the first information;
a priority of a bearer corresponding to the first information;
a PC5 quality of service flow indicator (PFI) corresponding to the first information; and
a fixed priority specified by a protocol.

14. The terminal according to claim 12, wherein the dedicated priority is any one of the following:
indicated by an upper layer of the terminal to a physical layer;
configured by a network device; and
pre-configured.

15. The terminal according to claim 12, wherein the first information comprises any one of the following:
sidelink data, PC5 media access control control element (MAC CE), PC5 discovery related message, PC5 synchronization related message, PC5 radio resource control (RRC) message, and PC5-S message.

16. The terminal according to claim 12, wherein the predefined rule comprises any one of the following:
that a PC5 synchronization related message has a highest priority;
priorities of a MAC CE and a signaling radio bearer being higher than a priority of a data radio bearer;
a priority of a first-type MAC CE being higher than a priority of a second-type MAC CE;
a priority of a first-type signaling radio bearer being higher than a priority of a second-type signaling radio bearer;
a descending order of priority being preset as: third-type MAC CE, signaling radio bearer, fourth-type MAC CE, and data radio bearer; and
a descending order of priority being preset as: signaling radio bearer, fifth-type MAC CE, and data radio bearer.

17. A non-transitory computer-readable storage medium storing a computer program thereon, wherein the computer program when being executed by a processor, implements the steps of:
determining a priority of first information; and
performing, based on the priority of the first information, an operation associated with the priority of the first information; wherein
a radio access technology (RAT) corresponding to the first information is new radio (NR); and
the priority of the first information is a first priority corresponding to the first information or a dedicated priority; or the priority of the first information is determined according to a predefined rule;
wherein in a case that the first information and second information need to be transmitted/received simultaneously, the performing, based on the priority of the first information, an operation associated with the priority of the first information comprises:
preferentially transmitting/receiving higher-priority information in the first information and the second information;
wherein in a case that the first information and the second information correspond to different hybrid automatic repeat request (HARQ) processes, the preferentially transmitting/receiving higher-priority information in the first information and the second information comprises:
transmitting/receiving the higher-priority information by using a first HARQ process, wherein the first HARQ process corresponds to the higher-priority information; and
the method further comprises:
dropping a second HARQ process, wherein the second HARQ process corresponds to lower-priority information in the first information and the second information.

18. The terminal according to according to claim 12, wherein the priority of the first information is indicated by a priority indication carried in NR SCI.

19. The storage medium according to according to claim 17, wherein the priority of the first information is indicated by a priority indication carried in NR SCI.

20. The storage medium according to according to claim 17, wherein the first priority corresponding to the first information is any one of the following:
a priority in a PC5 quality of service indicator (PQI) corresponding to the first information;
a priority indicated by an application layer and corresponding to the first information;
a priority in a quality of service (QOS) parameter corresponding to the first information;
a priority of a logical channel corresponding to the first information;
a priority of a bearer corresponding to the first information;
a PC5 quality of service flow indicator (PFI) corresponding to the first information; and
a fixed priority specified by a protocol.

* * * * *